(12) United States Patent
Wang et al.

(10) Patent No.: US 9,893,666 B2
(45) Date of Patent: Feb. 13, 2018

(54) METHOD AND SYSTEM FOR CONTROLLING ANGULAR ROTOR SPEEDS OF SENSORLESS INDUCTION MOTORS

(71) Applicant: Mitsubishi Electric Research Laboratories, Inc., Cambridge, MA (US)

(72) Inventors: Yebin Wang, Acton, MA (US); Jian Zhang, Lafayette, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 330 days.

(21) Appl. No.: 14/612,460

(22) Filed: Feb. 3, 2015

(65) Prior Publication Data

US 2016/0226414 A1    Aug. 4, 2016

(51) Int. Cl.
H02P 23/00 (2016.01)
H02P 21/14 (2016.01)
H02P 21/13 (2006.01)
H02P 21/18 (2016.01)

(52) U.S. Cl.
CPC ............ H02P 21/141 (2013.01); H02P 21/13 (2013.01); H02P 21/18 (2016.02); H02P 2207/01 (2013.01)

(58) Field of Classification Search
USPC ...... 318/799, 400.15, 715, 823, 400.07, 432
See application file for complete search history.

(56) References Cited

U.S. PATENT DOCUMENTS

2011/0089882 A1*  4/2011  Yeh ...................... G01R 31/343
                                                                  318/490

2014/0191697 A1*  7/2014  Mao ...................... H02P 29/021
                                                                  318/490

OTHER PUBLICATIONS

L. Harnefors, "Globally stable speed-adaptive observers for sensorless induction motor drives," IEEE Trans. Ind. Electron., vol. 54, No. 2, pp. 1243-1245, Apr. 2007.
H. Kubota, K. Matsuse, and T. Nakano, "DSP-based speed adaptive flux observer of induction motor," IEEE Trans. Ind. Appl., vol. 29, No. 2, pp. 344-348, Mar./Apr. 1993.
S. Solvar, B. Le, M. Ghanes, J. P. Barbot, and G. Santomenna, "Sensorless second order sliding mode observer for induction motor," in IEEE International Conference on Control Applications, Yokohama, Japan, 2010, pp. 1933-1938.

(Continued)

*Primary Examiner* — Eduardo Colon Santana
*Assistant Examiner* — Iftekhar Mustafa
(74) *Attorney, Agent, or Firm* — Gene Vinokur; James McAleenan; Hironori Tsukamoto

(57) ABSTRACT

A method controls an angular speed of an induction motor by measuring a stator current and a stator voltage of the induction motor to determine an estimated stator current, an estimated rotor flux amplitude, and an estimated rotor speed. A first virtual control signal is based on a reference rotor speed and the estimated rotor speed. A second virtual control signal is based on the first virtual control signal and an estimated electromagnetic torque. A third virtual control signal is based on a reference rotor flux reference and the estimated rotor flux amplitude. A fourth virtual control signal is based on the third virtual control signal and an estimate of the third virtual control signal. Then, control input voltages are applied to the induction motor based on the second virtual control signal and the fourth virtual control signal.

18 Claims, 8 Drawing Sheets

(56) References Cited

OTHER PUBLICATIONS

M. Hilairet, F. Auger, and E. Berthelot, "Speed and rotor flux estimation of induction machinese using a two-stage extended Kalman filter," Automatica, vol. 45, No. 8, pp. 1819-1827, Aug. 2009.

Y. R. Kim, S.-K. Sul, and M.-K. Park, "Speed sensorless vector control of induction motor using extended Kalman filter," IEEE Trans. Ind. Appl., vol. 30, No. 5, pp. 1225-1233, Sep./Oct. 1994.

M. Barut, S. Bogosyan, and M. Gokasan, "Speed-sensorless estimation for induction motors using extended Kalman filter," IEEE Trans. Ind. Electron., vol. 54, No. 1, pp. 272-280, Jan. 2007.

* cited by examiner

METHOD AND SYSTEM FOR CONTROLLING ANGULAR ROTOR SPEEDS OF SENSORLESS INDUCTION MOTORS

RELATED APPLICATION

The U.S. Patent Application is related to U.S. Ser. No. 14/612,429, co-filed herewith on Feb. 3, 2015, and incorporated herein. Both Applications disclose a method and system for controlling the angular rotor speed of sensorless induction motors.

FIELD OF THE INVENTION

This invention relates generally to controlling an angular rotor speed of induction motors, and more particularly to controlling sensorless variable speed induction motors.

BACKGROUND OF THE INVENTION

Methods for controlling the angular rotor speed of induction motors have evolved from variable frequency control to vector control and other variants, e.g., direct and indirect field oriented state feedback control, sensorless speed control, and adaptive field oriented control. Vector control with a full state or rotor speed measurements can provide adequate performance at the expenses of additional sensors, which can limit their application in practice.

Sensorless speed control includes sensorless adaptive control, where the rotor speed is typically treated as an unknown parameter to avoid nonlinearity in dynamics. Controls relying on parameter assumptions generally have unsatisfactory transient performance inherent to the adaptation.

Other methods that use a high gain state estimator, sliding mode estimator, or an extended Kalman filter (EKF) avoid the parameter assumptions, but fail to address performance. As an example, resorting to nonlinear estimator techniques entails a system in certain normal forms, which turns out to be difficult. Well-known high gain estimators designs assume an observable canonical form.

FIG. 1 shows a prior art sensorless speed motor drive for an induction motor. The reference numerals for FIG. 1 are:
- 101 Speed control
- 102 Flux control
- 103 Current control
- 104 Clarke Transformation/Power electronics
- 105 Induction motor
- 106 Flux estimator
- 107 Speed estimator
- 111 desired speed
- 112 estimated speed
- 113 estimated speed error
- 114 desired q-axis current
- 115 estimated/measured q-axis current
- 116 q-axis current tracking error
- 117 desired flux modulus
- 118 estimated flux modulus
- 119 estimated flux error
- 120 desired d-axis current
- 121 estimated/measured d-axis current
- 122 d-axis current tracking error
- 123 desired voltage input commands
- 124 measured voltage inputs
- 125 current measurements
- 126 estimated flux.

Input to the motor drive is a reference rotor flux amplitude signal 111. An estimate 112 from a flux estimator block 106 is added to the signal 111 so that the signal 113 represents a difference between signals 111 and 112.

A flux control block 101 determines a stator current 114 used to control the rotor flux linkage in the d-axis. A signal 115 is an estimate or true stator current, in the d-axis, produced by a flux estimator 106. A difference 116 between the signals 115 and 114 is used by a current control block 103 to determine a reference stator voltage 123 in the d-axis. Similarly, a signal 117 denotes the desired rotor speed reference of the induction motor.

A signal 118 denotes an estimated rotor speed produced by a speed estimator 107 based on output signal 126 of the flux estimator 106. A difference 119 between signals 117 and 118 is used to determine a reference stator current 120, in the q-axis, by the flux control block 102.

An estimated or true stator current 121, in the q-axis, is compared to the reference stator current 120, in an imaginary q-axis used to control the torque of the motor, to produce a difference signal 122. The current control block 103 determines the stator voltage signal 123, in d- and q-axes, on the basis of difference signals 116 and 122. A Clarke or Park transformation 104 converts the desired stator voltage, in d- and q-axes, into three-phase voltages 124 to drive the induction motor 105.

Note that the flux estimator 106 takes the three-phase voltages 124 and sensed phase currents 125 as input signals, and outputs estimated or true stator currents 115 and 121, estimated rotor flux amplitude 112, and estimated rotor speed signal 118 to produce the difference signals 113, 116, 119, and 122. The estimated stator current and the estimated rotor flux amplitude, and the estimated rotor speed can be determined independently. The signal 119 is used for speed control 102.

SUMMARY OF THE INVENTION

The embodiments of the invention provide a method and system for controlling an angular rotor speed of an induction motor without measuring the angular rotor speed. With a general state estimator, the tracking control explicitly takes parametric uncertainties and state estimation errors into consideration by backstepping-based adaptive control.

In control theory, state estimators are also known as state observers. The state observer provides an estimate of internal states of a given system from measurements of the input and output of the system. Herein, the terms estimator and observer are used interchangeably.

The method results in the tracking control where the ranges of gains are practical. Thus, the method can be used by motor drives for high bandwidth speed tracking tasks. Moreover, the gain selection for the controller is relatively straightforward. An extended Kalman filter (EKF) is used to estimate the state of the induction motor.

Different from prior art, where the EKF design is typically based on a model of an induction motor model a constant rotor speed, the invention considers and validates an EKF state estimator for the induction motor that can operate at variable speeds. The state estimation errors are explicitly dealt with back-stepping control design, so that the final control accuracy is guaranteed. There is no assumption on time-scale separation for both the estimation and the control design, so that high overall bandwidth is achieved even with practical constrains.

The method can achieve a high bandwidth, e.g., 200 Hz, and high precision speed tracking of the induction motor under practical implementation constraints, e.g., a 20 kHz sampling rate and a 400 V input saturation. The gain selection for the method is straightforward and does not depend on trajectories. The method can track various trajectories as long as the state and control input constraints are considered.

DETAILED DESCRIPTION OF THE PREFERRED EMBODIMENTS

Figure 1:
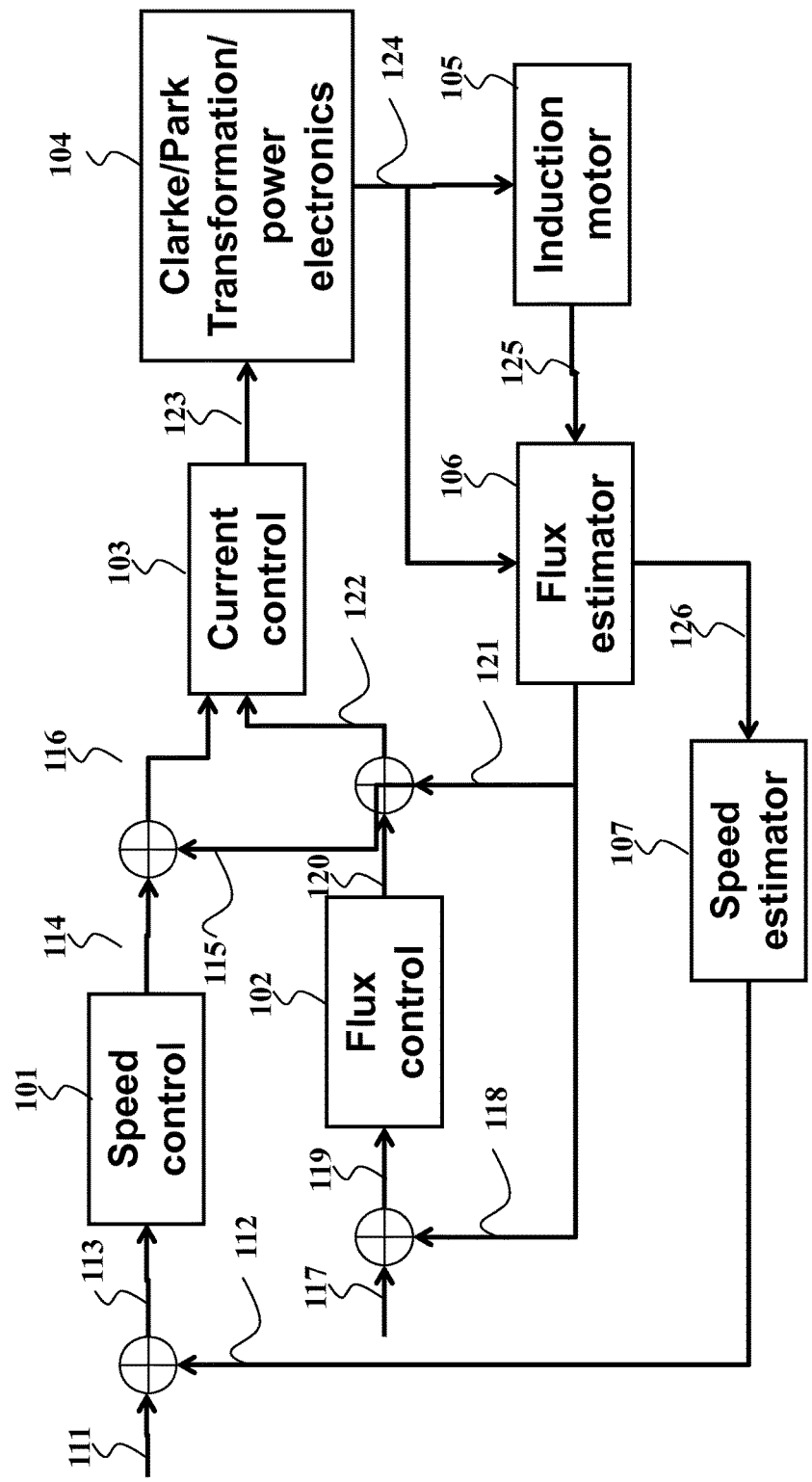
FIG. 1 is a block diagram of a prior art sensorless speed motor drive and induction motor.

The embodiments of the invention provide a method and system for controlling an angular rotor speed of an induction motor based on sensing stator currents in the motor.

Model of Induction Motor

With the assumption of linear magnetic circuits and balanced operating conditions, a two-phase equivalent model of an induction motor, represented in a fixed a-b reference frame, can be written as $$\dot{\omega} = \mu(\phi_{ra} i_{sb} - \phi_{rb} i_{sa}) - T_L(\omega)/J \quad (1)$$

$$\dot{i}_{sa} = \alpha\beta\phi_{ra} + n_p\beta\omega\phi_{rb} - \gamma i_{sa} + \frac{1}{\sigma} u_{sa}$$

$$\dot{i}_{sb} = \alpha\beta\phi_{rb} - n_p\beta\omega\phi_{ra} - \gamma i_{sb} + \frac{1}{\sigma} u_{sb}$$

$$\dot{\phi}_{ra} = -\alpha\phi_{ra} - n_p\omega\phi_{rb} + \alpha M i_{sa}$$

$$\dot{\phi}_{rb} = -\alpha\phi_{rb} + n_p\omega\phi_{ra} + \alpha M i_{sb}$$

$$y = (i_{sa}, i_{sb})^T,$$

where r and s represent the rotor and stator, a and b represent the a and b axis, $\omega$ is the angular speed of the rotor, i denotes the current, $\varphi$ denotes the flux linkage, u is the input stator voltage, R, L, M, J, $T_L(\omega)$ and $n_p$ denote the resistance, inductance, mutual inductance, rotor inertia, load torque, and number of pole pairs, respectively, and $$\alpha = \frac{R_r}{L_r},\ \beta = \frac{M}{\sigma L_r},\ \sigma = L_s - \frac{M^2}{L_r},\ \gamma = \frac{M^2 R_r + L_r^2 R_s}{\sigma L_r^2},\ \mu = \frac{3}{2}\frac{n_p M}{J L_r}.$$

For simplicity, the load torque $T_L$ is assumed to be parameterized as $T_L(\omega) = T_0 + C_f \omega$ with $T_0$ and $C_f$ constants. With the following change of variables $$x_1 = \omega,\ x_2 = i_{sa},\ x_3 = i_{sb},\ x_4 = \varphi_{ra},\ x_5 = \varphi_{rb},\ u_1 = u_{sa},\ u_2 = u_{sb},$$

$$b = \frac{1}{\sigma},\ a_1 = \mu,\ a_2 = \frac{T_0}{J},\ a_3 = \frac{C_f}{J},$$

$a_5 = \alpha\beta$, $a_6 = n_p\beta$, $a_7 = \gamma$, $a_8 = \alpha$, $a_9 = n_p$, $a_{10} = \alpha M$, equation (1) can be rewritten as $$\dot{x} = f(x, u) = g(x) + Bu \quad (2)$$

$$y = Cx,$$

$$g(x) = \begin{bmatrix} a_1(x_3 x_4 - x_2 x_5) - a_2 - a_3 x_1 \\ a_5 x_4 + a_6 x_1 x_5 - a_7 x_2 \\ a_5 x_5 - a_6 x_1 x_4 - a_7 x_3 \\ -a_8 x_4 - a_9 x_1 x_5 + a_{10} x_2 \\ -a_8 x_5 + a_9 x_1 x_4 + a_{10} x_3 \end{bmatrix},$$

$$B = \begin{bmatrix} 0 & 0 \\ b & 0 \\ 0 & b \\ 0 & 0 \\ 0 & 0 \end{bmatrix},\ C = \begin{bmatrix} 0 & 1 & 0 & 0 & 0 \\ 0 & 0 & 1 & 0 & 0 \end{bmatrix}$$

with $x = [x_1, x_2, x_3, x_4, x_5]^T$, $u = [u_1, u_2]^T$.

Problem Formulation

Many sensorless speed motor drives use vector control to regulate two variables: the rotor speed $x_1$ and the amplitude $x_4^2 + x_5^2$ of the rotor flux. The invention synthesizes the control input u such that $x_1$ and $x_4^2 + x_5^2$ track the angular speed $\omega_d(t)$, and the flux linkage $\varphi_d^2$, respectively using the induction motor model of equation (2).

General State Estimator

A general state estimator can be expressed as $$\dot{\hat{x}} = \hat{f} + O(\tilde{y})$$

$$\hat{y} = C\hat{x} \quad (3)$$

where $\hat{x} \in \mathbb{R}^5$, $\hat{f} = f(\hat{x}, u)$, $\tilde{y} = y - \hat{y}$, and O is an output injection term. Equation (3) is an abstraction of well-known state estimators. For example, extended Kalman filter (EKF) and Luenberger based estimators correspond to the following expression of the vector field I as $$O_i(\tilde{x}_2, \tilde{x}_3) = l_{i1}\tilde{y}_1 + l_{i2}\tilde{y}_2, 1 \le i \le 5,$$

and a sliding mode observer (SMO) corresponds to $$O_i(\tilde{x}_2, \tilde{x}_3) = h_{i1} S(\tilde{y}_1) + h_{i2} S(\tilde{y}_2), 1 \le i \le 5.$$

We define estimation errors as $\tilde{x} = x - \hat{x}$. Given information of previous states, we can construct a projection mapping to bound the state estimates $$\hat{x}_i = \text{Proj}_{\hat{x}_i}(\tau_i)$$

$$\tau_i = \hat{f}_i + O_i \quad (4)$$

where $\hat{f}_i$ is the $i^{th}$ component of $\hat{f}$. The projection mapping, when applied to a scalar, is $$\text{Proj}_{\hat{x}_i}(\bullet_i) = \begin{cases} 0 & \text{if } \hat{x}_i = x_{imax} \text{ and } \bullet_i > 0 \\ 0 & \text{if } \hat{x}_i = x_{imin} \text{ and } \bullet_i < 0 \\ \bullet_i & \text{otherwise} \end{cases} \quad (5)$$

When applied to a vector $\hat{x}$, the component-wise projection mapping is $$\text{Proj}_{\hat{x}}(\bullet) = [\text{Proj}_{\hat{x}_1}(\bullet_1), \ldots, \text{Proj}_{\hat{x}_5}(\bullet_5)]^T.$$

For any function $\tau_i$, the projection mapping of equation (5) guarantees $$\hat{x} \in \Omega_{\hat{x}} \triangleq \{\hat{x} : x_{imin} \le \hat{x} \le x_{imax}\}. \quad (6)$$

A slowly varying load torque can be treated by augmenting the state x with $a_2$, which is adapted in the estimator. Other slowly changing quantities, $R_r$, $a_5$ $a_7$ $a_8$ $a_{10}$, can be treated in a similar manner.

State Estimator

We select the EKF as a state estimator to avoid a complicated gain tuning process. The idea of using EKF and its variants in speed sensorless motor drives are not new. Numerous methods use the EKF with a simplified induction motor model and a constant rotor speed, i.e., as expressed in equation (1) with $\dot\omega=0$, see Kim et al., "Speed sensorless vector control of induction motor using extended Kalman filter," IEEE Trans. Ind. Appl., vol. 30, no. 5, pp. 1225-1233, September/October 1994, and Barut et al. "Speed-sensorless estimation for induction motors using extended Kalman filter," IEEE Trans. Ind. Electron., vol. 54, no. 1, pp. 272-280, January 2007.

Using a simplified induction motor model does simplify the structure of the EKF estimator. Because a simplified conventional induction motor model implicitly assumes speed as a parameter, the corresponding EKF necessarily performs as an adaptive estimator, which generally yields slowly convergent estimation error dynamics.

We reduce the effect of this limitation by considering the EKF estimator based on the full induction motor model of equation (2).

With the sampling rate of the filter denoted by $T_s$ and the forward difference method, the system of equation (2) is discretized as $$x_k = T_s f(x_{k-1}, u_{k-1}) + x_{k-1} = f'(x_{k-1}, u_{k-1}). \quad (7)$$

Linearization of the dynamics is expressed as $$A = \frac{\partial f}{\partial x} = \begin{bmatrix} -a_3 & -a_1 x_5 & a_1 x_4 & a_1 x_3 & -a_1 x_2 \\ a_6 x_5 & -a_7 & 0 & a_5 & a_6 x_1 \\ -a_6 x_4 & 0 & -a_7 & -a_6 x_1 & a_5 \\ -a_9 x_5 & a_{10} & 0 & -a_8 & -a_9 x_1 \\ a_9 x_4 & 0 & a_{10} & a_9 x_1 & -a_8 \end{bmatrix},$$

hence, $A_k = T_s A + I$ with the identity matrix I.

Predictions

A predicted state estimate is $$\hat{x}_{k|k-1} = f'(\hat{x}_{k-1|k-1}, u_{k|k-1}), \text{ and} \quad (8)$$

a predicted covariance estimate is $$P_{k|k-1} = A_{k-1} P_{k-1|k-1} A_{k-1}^T + Q_{k-1}, \quad (9)$$

Update

A measurement residual is $$\tilde{y}_k = y_k - C \tilde{x}_{k|k-1}, \quad (10)$$

a residual covariance is $$S_k = C_k P_{k|k-1} C_k^T + R_k, \quad (11)$$

a near-optimal Kalman gain is $$K_k = P_{k|k-1} C_k^T S_k^{-1}, \quad (12)$$

an updated state estimate is $$\hat{x}_{k|k} = \hat{x}_{k|k-1} + K_k \tilde{y}_k, \quad (13)$$

an updated covariance estimate is $$P_{k|k} = (I - K_k C_k) P_{k|k-1}, \text{ and} \quad (14)$$

for the general observer form $$L = \frac{K_k}{T_s}. \quad (15)$$

Integrated Control Design

Assumptions and General Treatment

We consider the general case where a system is subject to parametric uncertainties $\theta \in \mathbb{R}^p$, and uncertain nonlinearities d. The following practical assumption can be used in a speed control step described below.

Assumptions

Both parametric and nonlinear uncertainties are bounded, i.e., $$\theta \in \Omega_\theta \triangleq \{\theta : \theta_{min} \leq \theta \leq \theta_{max}\}, \text{ and} \quad (16)$$

$$\tilde{d} \in \Omega_d \triangleq \{\tilde{d} : \|\tilde{d}\| \leq \delta_d\}, \quad (17)$$

where $\tilde{d} = d - \hat{d}$, $\theta_{min} = [\theta_{1min}, \ldots, \theta_{pmin}]^T$, $\theta_{max} = [\theta_{1max}, \ldots, \theta_{pmax}]^T$ are known constants. The operation ≤ for two vectors is performed componentwise, and $\delta_d$ is a known bounding function.

Parametric uncertainties are treated by adaptation and projection. Let $\hat{\theta}$ denote the estimate of $\theta$ and $\tilde{\theta}$ so that an estimation error is $\tilde{\theta} = \theta - \hat{\theta}$. In view of equation (16), the following adaptation law with discontinuous projection modification can be used $$\dot{\hat{\theta}} = \text{Proj}_{\hat{\theta}}(\Gamma \tau), \quad (18)$$

where $\Gamma > 0$ is a diagonal matrix, $\tau \in \mathbb{R}^p$ is a vector of adaptation functions synthesized later. The projection mapping $$\text{Proj}_{\hat{\theta}}(\bullet) = [\text{Proj}_{\hat{\theta}_1}(\bullet_1), \ldots, \text{Proj}_{\hat{\theta}_p}(\bullet_p)]^T$$

is taken as follows $$\text{Proj}_{\hat{\theta}_i}(\bullet_i) = \begin{cases} 0 & \text{if } \hat{\theta}_i = \theta_{imax} \text{ and } \bullet_i > 0 \\ 0 & \text{if } \hat{\theta}_i = \theta_{imin} \text{ and } \bullet_i < 0 \\ \bullet_i & \text{otherwise} \end{cases} \quad (19)$$

It can be shown that for any $\tau$, the adaption law in equations (18)-(19) ensures equation (16) and $$\tilde{\theta}^T(\Gamma^{-1} \text{Proj}_{\hat{\theta}}(\Gamma \tau) - \tau) \leq 0, \forall \tau. \quad (20)$$

For the induction motor case, parametric uncertainties can be due to the slowly time-varying resistance and load torque, and uncertain nonlinearities can be result from the state estimation error $\tilde{x} = x - \hat{x}$.

When restricted to the induction motor case, state estimation error $\tilde{x}$ is bounded as $$\tilde{x} \in \Omega_x \triangleq \{\tilde{x} : \tilde{x}_{min} \leq \tilde{x} \leq \tilde{x}_{max}\}, \quad (21)$$

where $\tilde{x}_{min} = [\tilde{x}_{1min}, \ldots, \tilde{x}_{5min}]^T$ and $\tilde{x}_{max} = [\tilde{x}_{1max}, \ldots, \tilde{x}_{5max}]^T$. Similarly, the boundedness of the state estimation error is guaranteed by equations (4)-(5).

Adaptive Backstepping Induction Motor Control

Figure 2A:
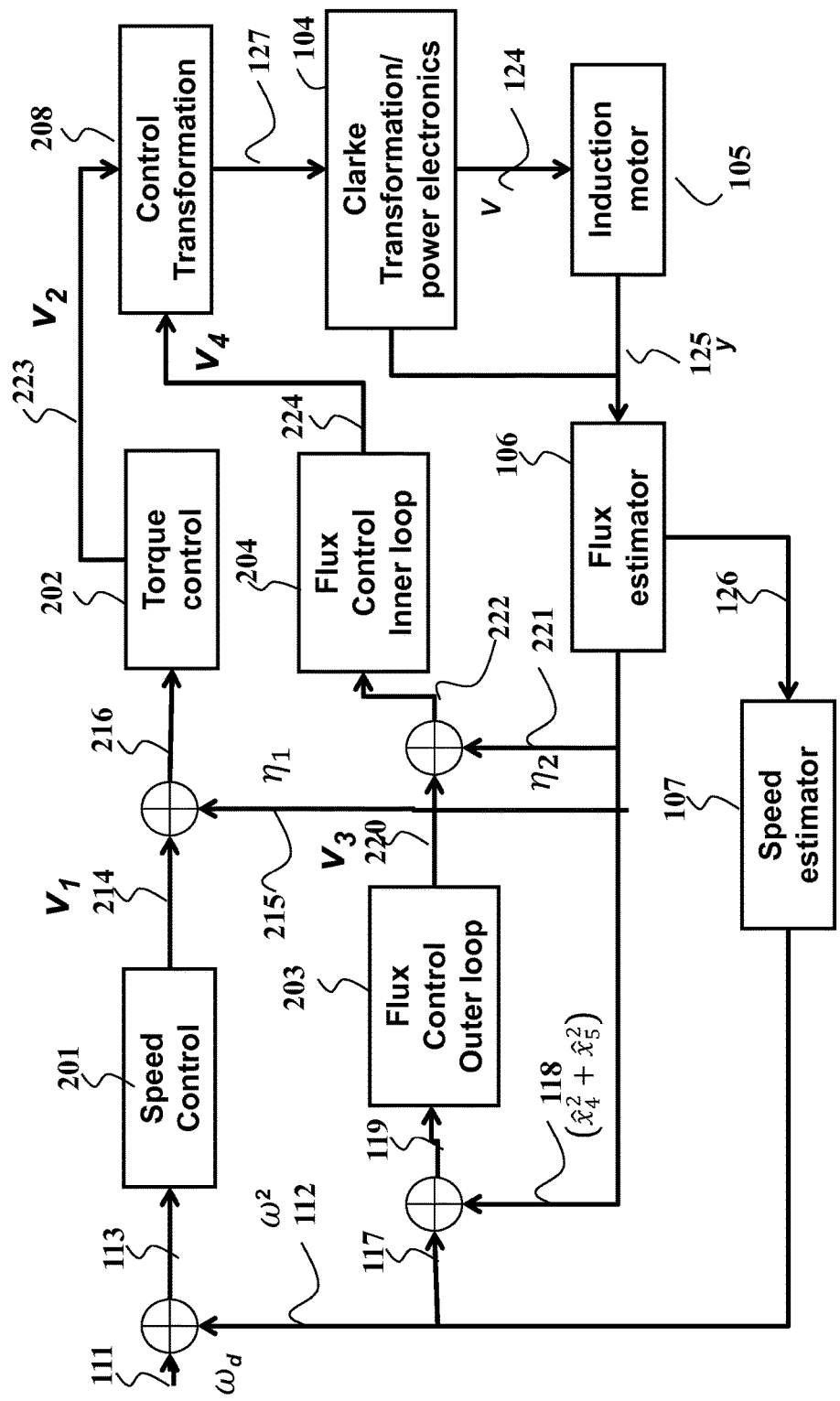
FIG. 2A is a block diagram of a sensorless speed motor drive and induction motor according to embodiments of the invention.
Figure 2B:
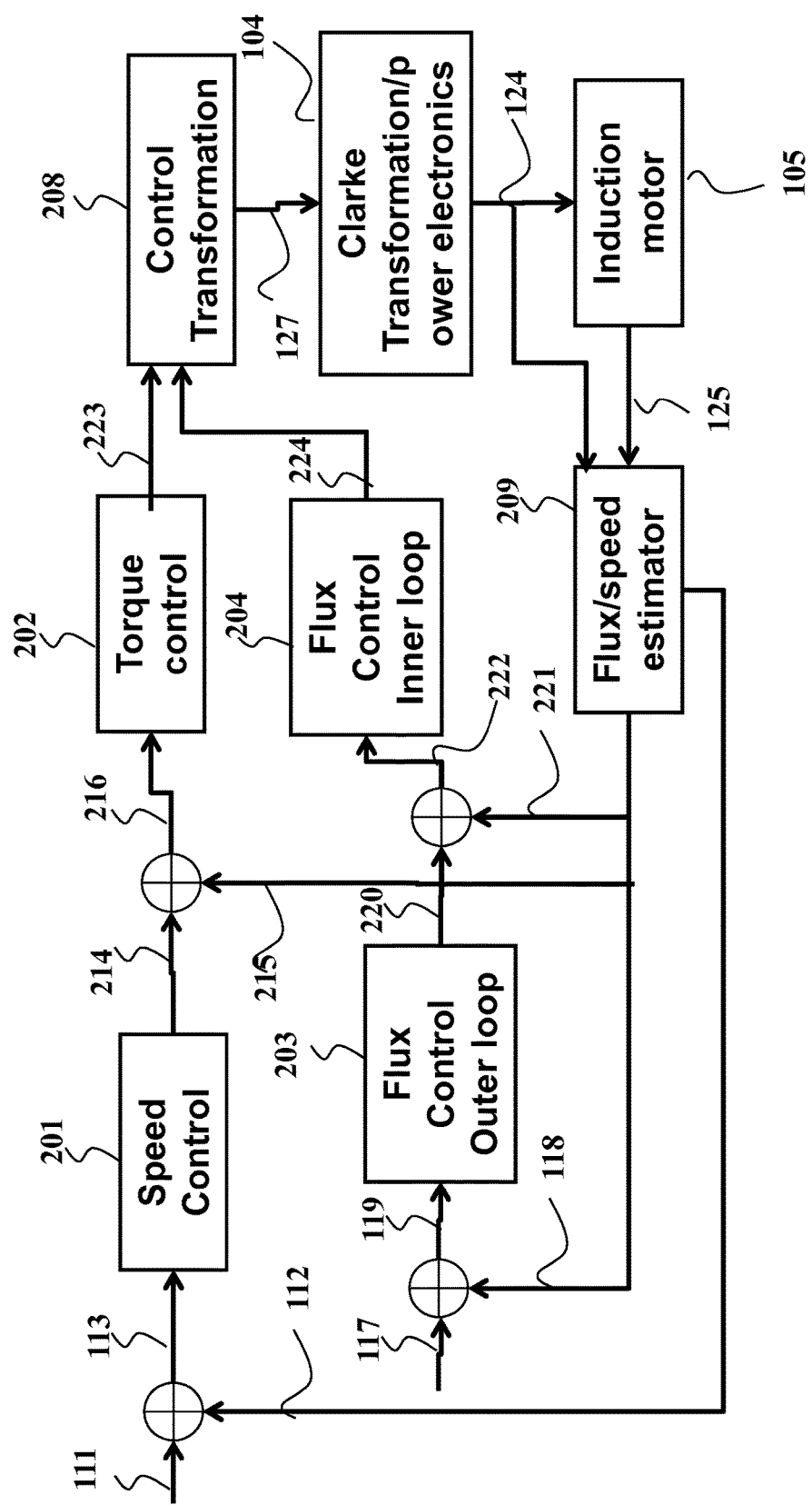
FIG. 2B is an alternative embodiment of the sensorless speed motor drive and induction motor according to embodiments of the invention.

FIG. 2A shows the overall architecture of the speed sensorless control method and system. FIG. 2B shows an alternative embodiment with a combined flux and speed estimator 209. The control design is performed using backstepping technique, and includes four steps:
- Step 1—Speed Control;
- Step 2—Torque Control;
- Step 3—Flux Outer Loop Control; and
- Step 4—Flux Inner Loop Control.

The first step is the speed control loop outputs an electromagnetic torque as a first virtual control signal. The second step is the torque control loop which regulates the electromagnetic torque. The third step is the flux control outer loop, and the fourth step is the flux control inner loops, which regulate the magnetic flux magnitude. State estimation errors are explicitly taken into account within all control design steps under the assumption described above.

The reference numerals for FIGS. 2A and 2B are:
- 201 Speed control (step 1)
- 202 Torque control (step 2)
- 203 Flux control outer loop (step 3)
- 204 Flux control inner loop (step 4)
- 104 Clarke Transformation/Power electronics
- 105 Induction motor
- 106 Flux estimator
- 107 Speed estimator
- 208 Control transformation
- 111 desired angular rotor speed
- 112 estimated angular rotor speed
- 113 estimated angular rotor speed error
- 214 desired torque
- 215 estimated torque
- 216 estimated torque error
- 117 desired flux modulus
- 118 estimated flux modulus
- 119 estimated flux error
- 124 measured voltage inputs
- 125 current measurement
- 126 estimated flux
- 127 input voltage command.
- 209 flux/speed estimator
- 220 flux loop virtual control
- 221 estimated flux loop control
- 222 flux loop virtual control error
- 223-224 combined voltage inputs The components of the motor drive can be implemented as hardware circuits or other electronic components.

Comparison with Prior Art

Before describing the structure of the controller according to the embodiments of this invention, details of the differences with the prior art controller are noted. The prior art controller focuses on the current 123 produced by the current control 103 for the transformation power electronics 104, which is not required in the embodiment shown in FIG. 2A. Also, the prior art has a relatively simple flux control 102, compared to the flux control of FIG. 2A with an inner 224 and outer 203 loop. The torque control loop 202 and control transformation 208 of FIG. 2A are missing from FIG. 1.

It is also noted that the embodiments use a number of "virtual" control signals, e.g., $v_1$, $v_2$, $v_3$, and $v_4$. The reason the controls are virtual is that the signal do not represent real physical values, but rather intermediate values.

Step 1—Speed Control

Figure 3:
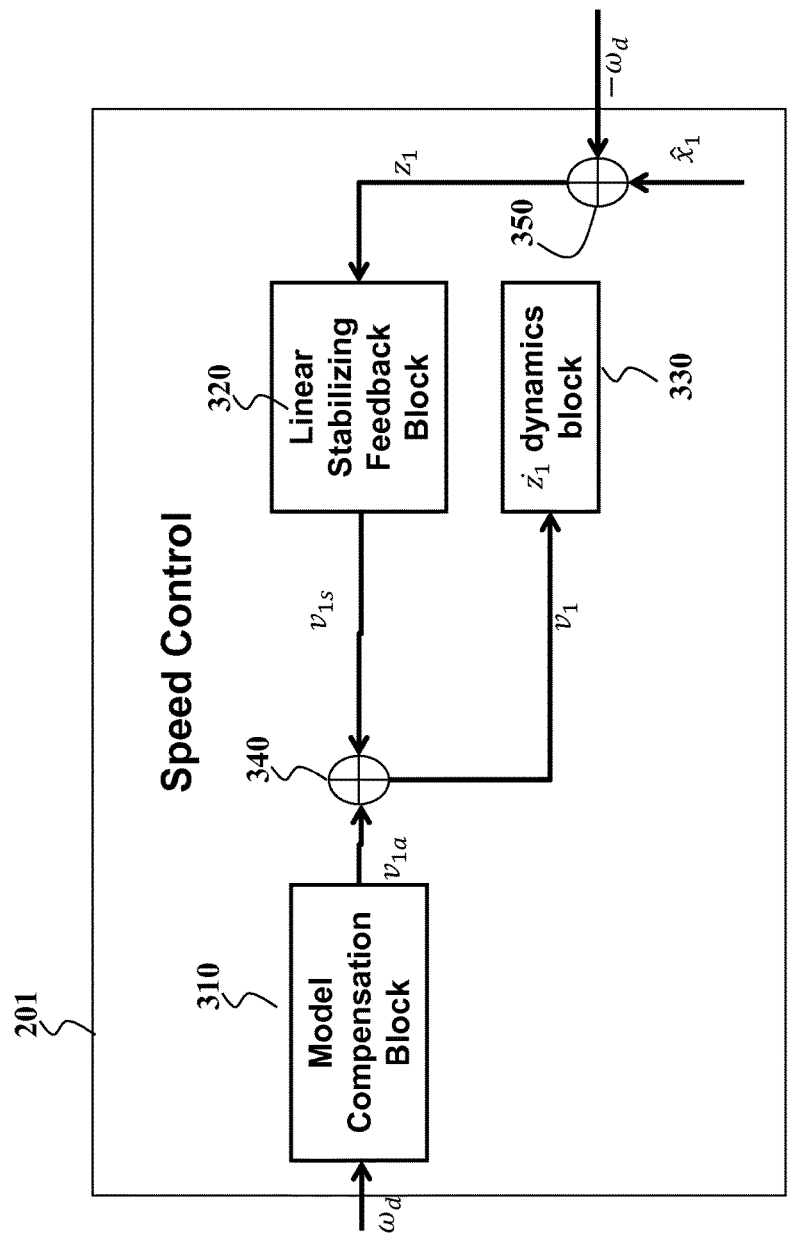
FIG. 3 is a flow diagram of model compensation and stabilizing for speed control according to embodiments of the invention.

FIG. 3 shows the structure and operation of the speed control loop 201. The loop includes model compensation block 310 receiving the angular speed $\omega_d(t)$, a linear stabilizing feedback block 320, a speed dynamics block, and two adders 340 and 350.

We define a speed tracking error as a difference 350 $z_1 = \hat{x}_1 - \omega_d$, and determine its time derivative as $$\dot{z}_1 = -a_3 z_1 + a_1(x_3 \hat{x}_4 - x_2 \hat{x}_5) + O_1(\tilde{x}_2, \tilde{x}_2) - \dot{\omega}_d - a_3 \omega_d - \hat{a}_2. \quad (22)$$

We define a first virtual control signal $v_1$, and define a difference between $v_1$ and an estimated electromagnetic torque $\eta_1 = a_1(x_3 \hat{x}_4 - x_2 \hat{x}_5)$ as $$z_2 = a_1(x_3 \hat{x}_4 - x_2 \hat{x}_5) - v_1. \quad (23)$$

Thus, the speed tracking error dynamics 330 can be rewritten as $$\dot{z}_1 = -a_3 z_1 + v_1 + z_2 + O_1(\tilde{x}_2, \tilde{x}_2) - \dot{\omega}_d - a_3 \omega_d - \hat{a}_2. \quad (24)$$

The first virtual control signal $v_1$ has two parts $$v_1 = v_{1a} + v_{1s}, \quad (25)$$

where $v_{1a}$ is the feedforward model compensation given by $$v_{1a} = -O_1(\tilde{x}_2, \tilde{x}_2) + \dot{\omega}_d + a_3 \omega_d + \hat{a}_2, \quad (26)$$

and $v_{1s}$ is an the feedback from the linear stabilization control 320

$$v_{1s} = -k_{1s1} z_1. \quad (27)$$

Thus, equation (24) can be rewritten as follows $$\dot{z}_1 = -k_1 z_1 + z_2, k_1 = a_3 + k_{1s1}. \quad (28)$$

Overall the first virtual control signal $v_1$ is $$v_1 = -k_{1s1} z_1 - O_1(\tilde{x}_2, \tilde{x}_2) + \dot{\omega}_d + a_3 \omega_d + \hat{a}_2, \quad (29)$$

and its derivative is determined as follows $$\dot{v}_1 = k_{1s1} k_1 z_1 + \ddot{\omega}_d + a_3 \dot{\omega}_d + \dot{\hat{a}}_2 + (l_{11} a_7 + l_{11} l_{21} + l_{12} l_{31}) \tilde{x}_2 + \quad (30)$$
$$(l_{12} a_7 + l_{11} l_{22} + l_{12} l_{32}) \tilde{x}_3 - (l_{11} a_5 - l_{12} a_6 \hat{x}_1) \tilde{x}_4 -$$
$$(l_{12} a_5 + l_{11} a_6 \hat{x}_1) \tilde{x}_5 - (l_{11} a_6 x_5 - l_{12} a_6 x_4) \tilde{x}_1 - k_{1s1} z_2,$$

which is used in the torque control step.

Step 2—Torque Control

Figure 4A:
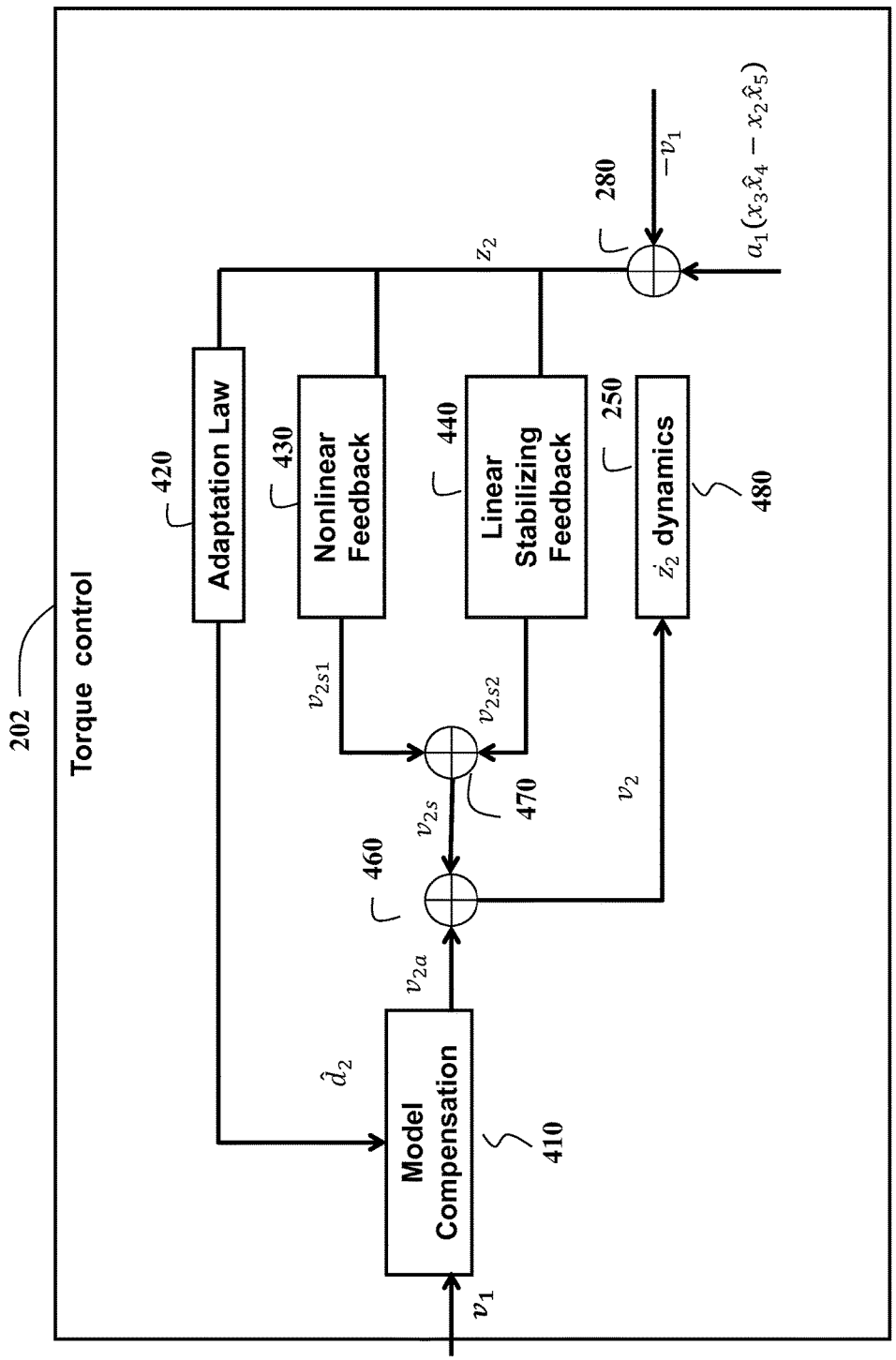
FIG. 4A is a flow diagram of torque control according to embodiments of the invention.

FIG. 4A shows the torque control loop 202 with model compensation 410, adaptation 420, nonlinear feedback 430, and torque dynamics 450. Three adders 460, 470 and 480 are used.

According to equations (23), (30), and (3), we have $$\dot{z}_2 = v_2 + \psi_2 + d_2. \quad (31)$$

where $v_2 = a_{21} b u_1 + a_{22} b u_2$ with $a_{21} = -a_1 \hat{x}_5$, $a_{22} = a_1 \hat{x}_4$, and $$\psi_2 = -(a_7 + a_8) v_1 - a_1 a_6 \hat{x}_1 (\hat{x}_4^2 + \hat{x}_5^2) - \quad (32)$$
$$a_1 a_9 \hat{x}_1 (\hat{x}_5 x_3 + \hat{x}_4 x_2) + a_1 a_{10} (\hat{x}_2 x_3 - \hat{x}_3 x_2) + a_1 x_3 O_4(\tilde{x}_2, \tilde{x}_3) -$$
$$a_1 x_2 O_5(\tilde{x}_2, \tilde{x}_3) - k_{1s1} k_1 z_1 - \ddot{\omega}_d - a_3 \dot{\omega}_d - \dot{\hat{a}}_2 -$$
$$(l_{11} a_7 + l_{11} l_{21} + l_{12} l_{31}) \tilde{x}_2 - (l_{12} a_7 + l_{11} l_{22} + l_{12} l_{32}) \tilde{x}_3 + k_{1s1} z_2$$
$$d_2 = a_1 a_5 (\tilde{x}_5 \hat{x}_4 - \tilde{x}_4 \hat{x}_5) - a_1 a_6 x_1 (\tilde{x}_4 \hat{x}_4 + \tilde{x}_5 \hat{x}_5) - a_1 a_6 \tilde{x}_1 (\hat{x}_4^2 + \hat{x}_5^2) +$$
$$(l_{11} a_5 - l_{12} a_6 \hat{x}_1) \tilde{x}_4 + (l_{12} a_5 + l_{11} a_6 \hat{x}_1) \tilde{x}_5 + (l_{11} a_6 x_5 - l_{12} a_6 x_4) \tilde{x}_1.$$

Note that $d_2$ denotes the disturbance due to state estimation errors. Although $d_2$ is typically time varying, one can estimate its slowly time-varying component, which can result in improved performance. In this case, the adaption law 420 for identifying $d_2$ can be $$\tau_{22} = z_2$$

$$\dot{\hat{d}}_2 = \text{Proj}(\Gamma_{22} \tau_{22}) \quad (33)$$

with $\hat{d}_2$ representing the estimation of $d_2$.

We denote $d_2 = \hat{d}_2 + \tilde{d}_2$. The second virtual control signal $v_2$ is rewritten as $$v_2 = v_{2a} + v_{2s}, \quad (34)$$

where the feedforward model compensation term is $$v_{2a} = \psi_2 - \hat{d}_2 - z_1, \quad (35)$$

and the feedback stabilization term $v_{2s}$ has a nominal stabilization term $v_{2s1}$ and a control term $v_{2s2}$ $$v_{2s} = v_{2s1} + v_{2s2}$$

$$v_{2s1} = -k_{2s1} z_2$$

$$k_2 = a_7 + a_8 + k_{2s1} \quad (36)$$

Thus, equation (31) can be rearranged as $$\dot{z}_2 = k_2 z_2 + v_{2s2} + \tilde{d}_2 - z_1. \quad (37)$$

Given the above assumption, $\tilde{d}_2$ is bounded. Thus, there exists $v_{2s2}$ such that the following conditions hold $$z_2(v_{2s2} + \tilde{d}_2) \le \epsilon_2, \text{ and}$$

$$z_2 v_{2s2} \le 0,$$

where $\epsilon_2$ is an arbitrarily small threshold parameter. One example of $v_{2s2}$ that satisfies above conditions is $$v_{2s2} = -\frac{1}{4\epsilon_2} h_2^2 z_2, \quad (38)$$

where $h_2 = \delta_{\tilde{d}_2}$ and $\delta_{\tilde{d}_2}$ is the bound of $\tilde{d}_2$.

The first and second virtual control signals $v_1$ and $v_2$ ensure that the speed $z_1$ and torque $z_2$ are bounded. We define a positive definite function $$V_{s2} = \frac{1}{2} z_1^2 + \frac{1}{2} z_2^2, \quad (39)$$

and its time derivative $$\dot{V}_{s2} = -k_1 z_1^2 + z_1 z_2 + z_2 \dot{z}_2 \quad (40)$$

$$= -k_1 z_1^2 - k_2 z_2^2 + z_2(v_{2s2} + \tilde{d}_2)$$

$$\le -k_1 z_1^2 - k_2 z_2^2 + \epsilon_2$$

$$\le -\lambda_2 V_{s2} + \epsilon_2.$$

Hence, $V_{s2}$ is bounded by $$V_{s2} \le \exp(-\lambda_2 t) V_{s2}(0) + \frac{\epsilon_2}{\lambda_2}[1 - \exp(-\lambda_2 t)], \quad (41)$$

where $\lambda_2 = 2\min(k_1, k_2)$, where the function min returns a minimum.

If the state estimator design can guarantee finite time convergence, i.e., $\tilde{d}_2 = 0$ after some $t_2$, then it can be shown that from Barbalat's lemma and equation (41) with $\tilde{d}_2 = 0$, the tracking error approaches zero over time, i.e., $z_1, z_2 \to 0$, as $t \to \infty$.

Step 3—Flux Outer Loop Control

Figure 4B:
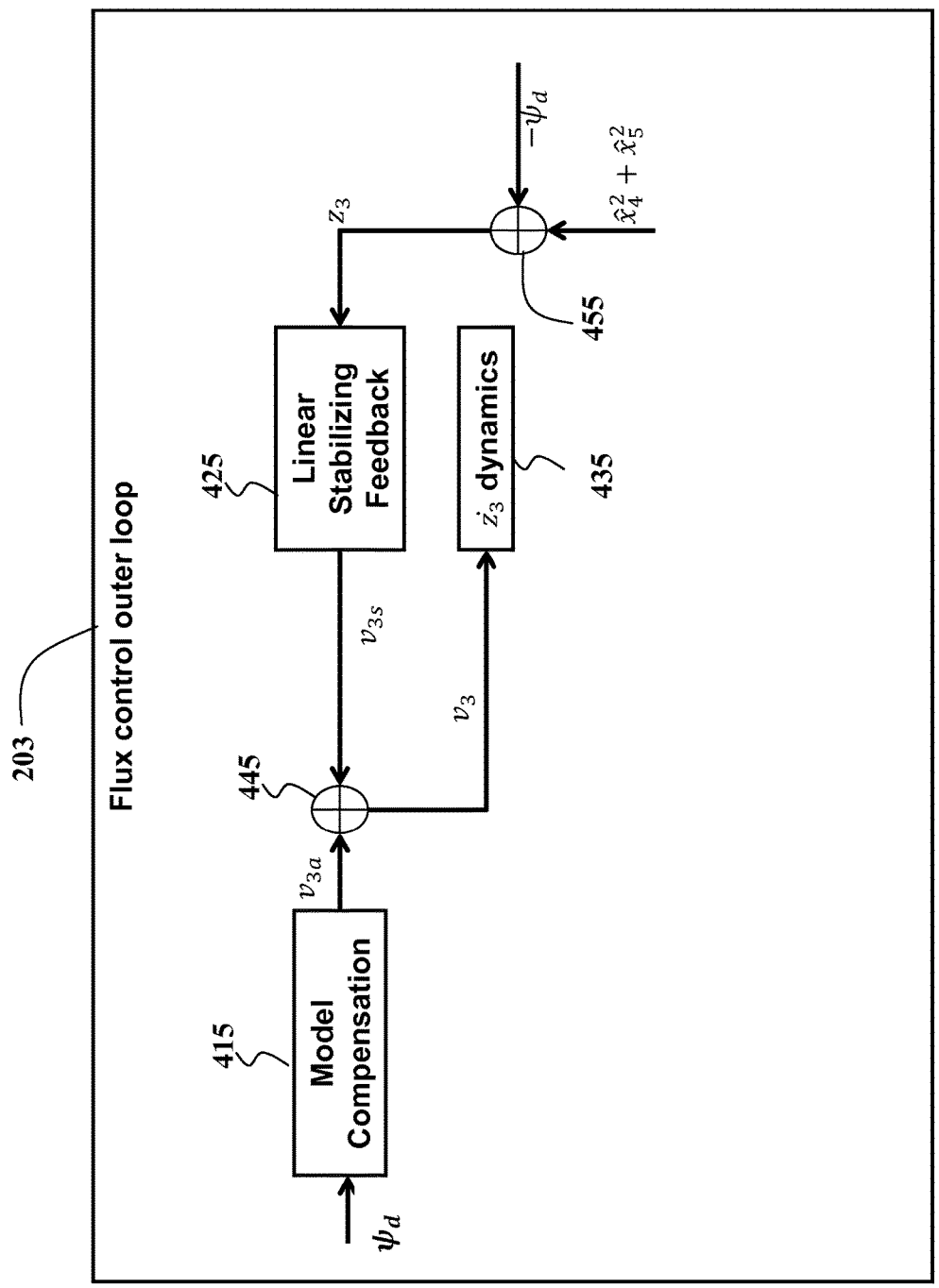
FIG. 4B is a flow diagram of a flux control outer loop according to embodiments of the invention.

FIG. 4B shows the structure and operation of the flux control outer loop with model compensation 415, linear stabilizing feedback 425, dynamics 445 and two adders 445 and 455.

Flux tracking control also uses backstepping. We define a flux module tracking error as $$z_3 = \hat{x}_4^2 + \hat{x}_5^2 - \varphi_d^2, \text{ and} \quad (42)$$

denote $\psi_d(t) = \varphi_d^2(t)$, and its time derivative $$\dot{z}_3 = 2a_{10}(x_2 \hat{x}_4 + x_3 \hat{x}_5) + \psi_3, \quad (43)$$

where $$\psi_3 = -2a_8(\hat{x}_4^2 + \hat{x}_5^2) - 2a_{10}(\tilde{x}_2 \hat{x}_4 + \tilde{x}_3 \hat{x}_5) +$$

$$2l_{41} \tilde{x}_2 \hat{x}_4 + 2l_{42} \tilde{x}_3 \hat{x}_4 + 2l_{51} \tilde{x}_2 \hat{x}_5 + 2l_{52} \tilde{x}_3 \hat{x}_5 - \dot{\psi}_d.$$

Note that $\psi_3$ depends on accessible signals. We use a third virtual control signal $v_3$, and a state $z_4$ to denote the discrepancy between $v_3$ and $$\eta_2 = 2a_{10}(x_2 \hat{x}_4 + x_3 \hat{x}_5), \text{ i.e.,}$$

$$z_4 = 2a_{10}(x_2 \hat{x}_4 + x_3 \hat{x}_5) - v_3. \quad (44)$$

Similar to the rewriting of the first virtual control signal $v_1$, the second virtual control signal $v_3$ is rewritten as $$v_3 = v_{3a} + v_{3s}, \quad (45)$$

where the feedforward model compensation is $v_{3a} = -\psi_3$ and the feedback stabilization term $v_{3s} = -k_{3s1} z_3$. Thus, we have $$\dot{z}_3 = -k_3 z_3 + z_4, \quad (46)$$

where $k_3 = k_{3s1}$.

Step 4—Flux Inner Loop Control

Figure 4C:
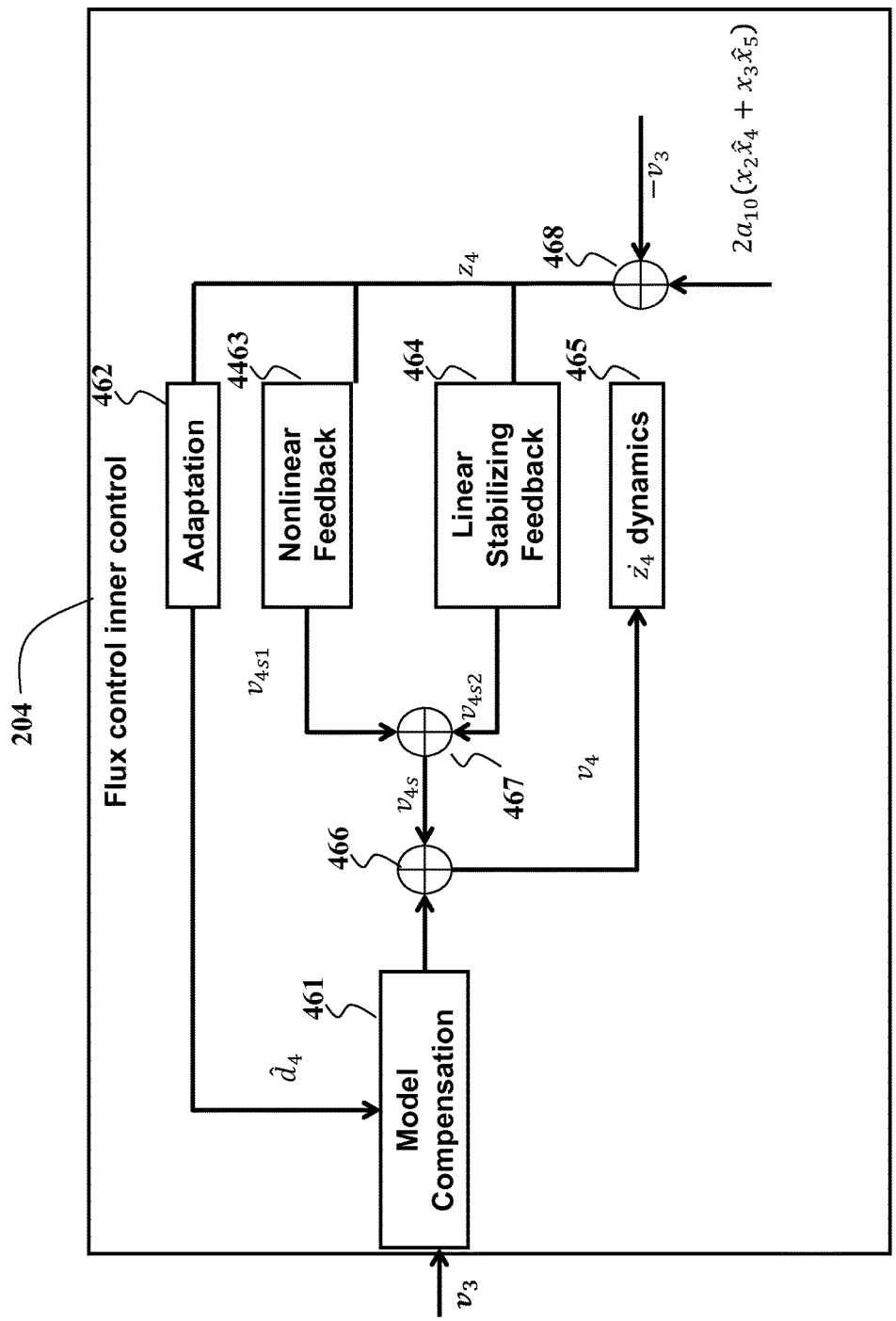
FIG. 4C is a flow diagram of a flux control inner loop according to embodiments of the invention.

FIG. 4C shows the structure and operation of the flux control inner loop with model compensation 461, adaptation 462, nonlinear feedback 465, linear stabilizing feedback, dynamics and three adders 466, 467 and 468.

The derivative of the virtual control signal discrepancy is $$\dot{z}_4 = v_4 + \psi_4 + d_4, \quad (47)$$

where $v_4 = a_{21} b u_1 + a_{22} b u_2$ with $a_{41} = 2a_{10} \hat{x}_4$ and $a_{42} = 2a_{10} \hat{x}_5$, and $$\psi_4 = 2a_{10} a_5 (\hat{x}_4^2 + \hat{x}_5^2) - 2a_{10} a_7 (\hat{x}_2 \hat{x}_4 + \hat{x}_3 \hat{x}_5) +$$

$$2a_{10}(l_{21} \tilde{x}_2 \hat{x}_4 + l_{22} \tilde{x}_3 \hat{x}_4 + l_{31} \tilde{x}_2 \hat{x}_5 + l_{32} \tilde{x}_3 \hat{x}_5) +$$

$$2(l_{41} \hat{x}_4 + l_{51} \hat{x}_5)(-(a_7 + l_{21}) \tilde{x}_2 - l_{22} \tilde{x}_3) +$$

$$2(l_{42} \hat{x}_4 + l_{52} \hat{x}_5)(-l_{31} \tilde{x}_2 - (a_7 + l_{32}) \tilde{x}_3) +$$

$$2(l_{41} \tilde{x}_2 + l_{42} \tilde{x}_3 + a_{10} \hat{x}_2 - 2a_8 \hat{x}_4) \times (-a_8 \hat{x}_4 - a_9 \hat{x}_1 \hat{x}_5 + a_{10} \hat{x}_2) +$$

$$2(l_{41} \tilde{x}_2 + l_{42} \tilde{x}_3 + a_{10} \hat{x}_2 - 2a_8 \hat{x}_4)(l_{41} \tilde{x}_2 + l_{42} \tilde{x}_3) +$$

$$2(l_{51} \tilde{x}_2 + l_{52} \tilde{x}_3 + a_{10} \hat{x}_3 - 2a_8 \hat{x}_5) \times (-a_8 \hat{x}_5 + a_9 \hat{x}_1 \hat{x}_4 + a_{10} \hat{x}_3) +$$

$$2(l_{51} \tilde{x}_2 + l_{52} \tilde{x}_3 + a_{10} \hat{x}_3 - 2a_8 \hat{x}_5)(l_{51} \tilde{x}_2 + l_{52} \tilde{x}_3) + k_3(-k_3 z_3 + z_4) - \ddot{\psi}_d$$

$$d_4 = (2a_5 l_{41} \tilde{x}_4 - 2a_6 l_{42} \hat{x}_4 \tilde{x}_1 + 2a_5 l_{51} \tilde{x}_5 - 2a_6 l_{52} \hat{x}_5 \tilde{x}_1) \tilde{x}_4 +$$

$$(2l_{41} a_6 \hat{x}_1 \tilde{x}_4 + 2l_{51} a_6 \hat{x}_1 \tilde{x}_5 + 2l_{42} a_5 \tilde{x}_4 + 2l_{52} a_5 \tilde{x}_5) \tilde{x}_5 +$$

$$2(l_{41} \hat{x}_4 + l_{51} \hat{x}_5) a_6 \tilde{x}_1 x_5 - 2(l_{42} \hat{x}_4 + l_{52} \hat{x}_5) a_6 \tilde{x}_1 x_4$$

A function of accessible signals is $\psi_4$, and $d_4$ represents the disturbance result from the state estimation error.

Although $d_4$ is time-varying, one can estimate its slowly time-varying component by adaptation and a discontinuous projection $$\tau_{44} = z_4$$

$$\dot{\hat{d}}_4 = \text{Proj}(\Gamma_{44}\tau_{44}), \qquad (48)$$

where $\hat{d}_4$ is the estimate of $d_4$.

We denote the fourth virtual control $v_4$ as $$v_4 = v_{4a} + v_{4s}, \qquad (49)$$

where the feedforward model compensation is $$v_{4a} = -\psi_4 - \hat{d}_4 - z_3. \qquad (50)$$

and the feedback term includes a nominal stabilization term $v_{4s1}$ and a control term $v_{4s2}$ given by $$v_{4s} = v_{4s1} + v_{4s2}$$

$$v_{4s1} = -k_4 z_4. \qquad (51)$$

We define $\tilde{d}_4 = d_4 - \hat{d}_4$. Thus, $$\dot{z}_4 = -k_4 z_4 + v_{4s2} + \tilde{d}_4 - z_3. \qquad (52)$$

Given the above assumption, $d_4$ is bounded. Also, the adaptive law equation (48) ensures the boundedness of $\hat{d}_4$. Consequently, we know $\tilde{d}_4$ is bounded. Hence, $v_{4s2}$ can be determined such that $$z_4(v_{4s2} + \tilde{d}_4) \le \epsilon_4, \text{ and}$$

$$z_4 v_{4s2} \le 0,$$

where $\epsilon_4$ is an arbitrarily small design parameter. One example of $v_{4s2}$ satisfying above inequalities is $$v_{4s2} = -\frac{1}{4\varepsilon_4} h_4^2 z_4, \qquad (53)$$

where $h_4 = \delta_{d_4}$ and $\delta_{d_4}$ is the bound of $\tilde{d}_4$.

Third and fourth virtual control signals $v_3$ and $v_4$ guarantee the boundedness of $z_3$ and $z_4$. Taking a Lyapunov function candidate $$V_{s4} = \frac{1}{2} z_3^2 + \frac{1}{2} z_4^2, \qquad (54)$$

and determining its time derivative, we can derive $$V_{s4} \le \exp(-\lambda_4 t) V_{s4}(0) + \frac{\varepsilon_4}{\lambda_4} [1 - \exp(-\lambda_4 t)], \qquad (55)$$

with $\lambda_4 = 2 \min(k_3, k_4)$. This implies the boundedness of $z_3$ and $z_4$. If we assume that $z_3$ and $z_4$ dynamics are only subject to parametric uncertainties, i.e., $\tilde{d}_4 = 0$), after some finite time $t_4$, the zero solution of $z_3$ and $z_4$ dynamics is asymptotically stable, i.e., $z_3$, $z_4 \to 0$, as $t \to \infty$.

The control input can be determined by $$\begin{bmatrix} u_1 \\ u_2 \end{bmatrix} = \frac{1}{b} \begin{bmatrix} -a_1 \hat{x}_5 & a_1 \hat{x}_4 \\ 2a_{10}\hat{x}_4 & 2a_{10}\hat{x}_5 \end{bmatrix}^{-1} \begin{bmatrix} v_{2a} + v_{2s} \\ v_{4a} + v_{4s} \end{bmatrix}. \qquad (56)$$

For the control input voltage to has unique solution, we have $$\begin{vmatrix} -a_1 \hat{x}_5 & a_1 \hat{x}_4 \\ 2a_{10}\hat{x}_4 & 2a_{10}\hat{x}_5 \end{vmatrix} = -2a_1 a_{10}(\hat{x}_4^2 + \hat{x}_5^2) \ne 0, \qquad (57)$$

which means that the flux modulus estimate should not be zero.

Flux and Speed Estimator

Figure 5:
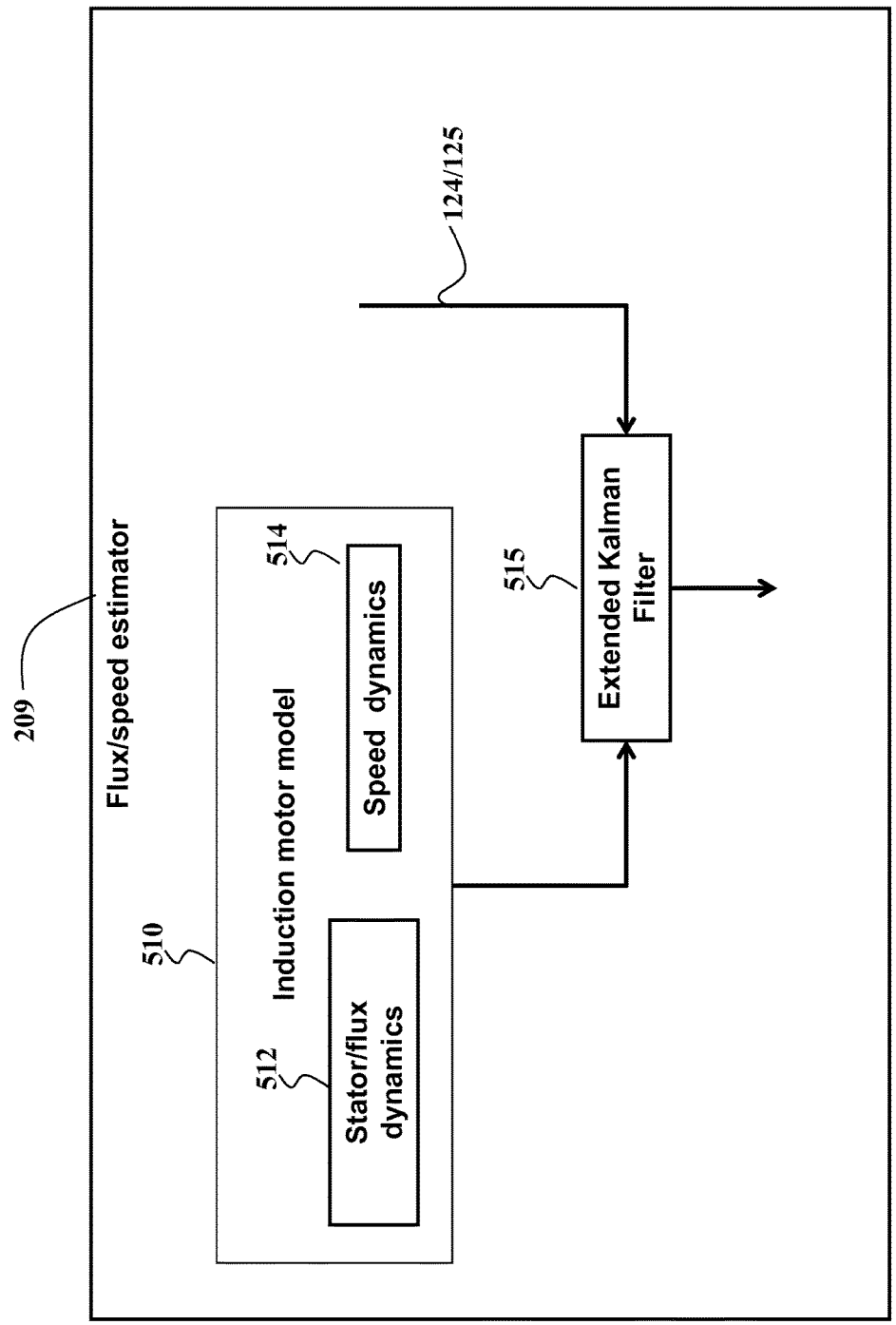
FIG. 5 is a schematic a flux and speed estimator according to embodiments of the invention.

FIG. 5 shows the flux and speed estimator 209 of FIG. 2B in greater detail. One embodiment of the flux and speed estimator is an EKF 515 designed on the basis of the induction motor model 510, which comprises stator and flux dynamics 512 and speed dynamics 514. The EKF 515 estimate the flux and speed according to measured signals: stator voltages 124 and stator currents 125.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an angular speed of an induction motor, based on operations including operation loops and operation blocks performed by motor drive hardware circuits connected to the motor, wherein the operations comprising steps of:
measuring a stator current and a stator voltage of the induction motor to determine an estimated stator current, an estimated rotor flux amplitude, and an estimated rotor speed;
determining a first virtual control signal based on a reference rotor speed and the estimated rotor speed;
determining a second virtual control signal based on the first virtual control signal and an estimated electromagnetic torque;
determining a third virtual control signal based on a reference rotor flux and the estimated rotor flux amplitude;
determining a fourth virtual control signal based on the third virtual control signal and an estimate of the third virtual control signal;
computing control input voltages from the second and fourth virtual control signals; and
applying the control input voltages to the induction motor, wherein the steps are performed in a motor drive, wherein the operation loops comprises:
a speed control loop to output an electromagnetic torque as the first virtual control signal;
a torque control loop to regulate the electromagnetic torque; and
a flux control outer loop and a flux control inner loop to regulate a magnitude of a magnetic flux.

2. The method of claim 1, wherein the angular speed is variable.

3. The method of claim 1, wherein the estimated stator current, the estimated rotor flux amplitude, and the estimated rotor speed are determined by an extended Kalman filter (EKF).

4. The method of claim 1, wherein the estimated stator current and the estimated rotor flux amplitude, and the estimated rotor speed are determined independently.

5. The method of claim 1, wherein the speed control loop includes a model compensation block, a linear stabilization block and a dynamics block.

6. The method of claim 5, wherein the model compensation block and the linear stabilizing feedback block are determined from dynamics of a speed tracking error.

7. The method of claim 6, wherein the first virtual control signal and the second virtual control signal ensure that the speed tracking error and torque are bounded.

8. The method of claim 1, wherein the torque control includes a model compensation block, a linear stabilizing feedback block, a nonlinear feedback block, an adaptive law block, and a dynamic block.

9. The method of claim 8, wherein the model compensation block, the linear stabilizing feedback block, the nonlinear feedback block, and the adaptive law block are determined from dynamics of an error between the first virtual control and an estimated electromagnetic torque.

10. The method of claim 1, wherein the flux control outer loop includes a model compensation block, a linear stabilizing feedback block, and a dynamic block.

11. The method of claim 10, wherein the model compensation block and the linear stabilizing feedback block are determined from dynamics of an error between a magnitude reference of a magnetic flux and an estimate of the magnitude reference of the magnetic flux.

12. The method of claim 1, wherein the flux control inner loop includes a model compensation block, a linear stabilizing feedback block, a nonlinear feedback block, an adaptive law block, and a dynamic block.

13. The method of claim 12, wherein the model compensation block, the linear stabilizing feedback block, the nonlinear feedback block, and the adaptive law block are determined from dynamics of an error between the third virtual control and an estimate of the error.

14. The method of claim 1, wherein the first virtual control signal includes feedforward model compensation and feedback from a linear stabilization control block.

15. The method of claim 1, wherein the third virtual control signal and the fourth virtual control signals guarantee a boundedness of a flux module tracking error and a discrepancy of the fourth virtual control signal.

16. A motor drive for controlling an angular speed of an induction motor, based on operation loops and operation blocks performed by motor drive hardware circuits connected to the motor, wherein the operation loops and blocks comprising:
- a speed control loop for determining a first virtual control signal based on a reference rotor speed and the estimated rotor speed;
- a torques control loop for determining a second virtual control signal based on the first virtual control signal and an estimated electromagnetic torque;
- a flux control outer loop for determining a third virtual control signal based on a reference rotor flux reference and the estimated rotor flux amplitude;
- a flux control loop for determining a fourth virtual control signal based on the third virtual control signal and an estimate of the third virtual control signal, wherein the control input voltages are applied to the induction motor based on the second virtual control signal and the fourth virtual control signal.

17. The motor drive of claim 16, further comprising:
- a speed control loop for outputting an electromagnetic torque as the first virtual control signal;
- a torque control loop for regulating the electromagnetic torque; and
- a flux control outer loop and a flux control inner loop for regulating a magnitude of a magnetic flux.

18. The motor drive of claim 16, wherein a speed tracking error is determined by the speed control loop further comprising:
- a model compensation block;
- a linear stabilization block; and
- a dynamics block.

* * * * *